(12) United States Patent
Kurokawa et al.

(10) Patent No.: US 8,619,997 B2
(45) Date of Patent: Dec. 31, 2013

(54) RECEIVING APPARATUS

(75) Inventors: Kazunari Kurokawa, Oizumi-machi (JP); Satoru Sekiguchi, Kumagaya (JP)

(73) Assignees: Sanyo Semiconductor Co., Ltd., Phoenix, AZ (US); Semiconductor Components Industries, LLC, Phoenix, AZ (US)

( * ) Notice: Subject to any disclaimer, the term of this patent is extended or adjusted under 35 U.S.C. 154(b) by 427 days.

(21) Appl. No.: 12/972,281

(22) Filed: Dec. 17, 2010

(65) Prior Publication Data

US 2011/0150238 A1   Jun. 23, 2011

(30) Foreign Application Priority Data

Dec. 17, 2009   (JP) ................................. 2009-286758

(51) Int. Cl.
   *H04H 20/47*   (2008.01)

(52) U.S. Cl.
   USPC ........ 381/2; 381/3; 381/4; 455/255; 455/323; 455/311; 455/302; 455/285

(58) Field of Classification Search
   USPC .............. 381/1–3, 94.1; 455/255, 196.1, 266, 455/260, 302, 285, 326, 313, 311, 317, 253, 455/296, 323; 375/316, 346
   See application file for complete search history.

(56) References Cited

U.S. PATENT DOCUMENTS

| | | | |
|---|---|---|---|
| 2001/0014595 A1* | 8/2001 | Tomiyama | 455/323 |
| 2009/0117870 A1* | 5/2009 | Ikeda et al. | 455/313 |
| 2009/0239492 A1 | 9/2009 | Kuga et al. | |
| 2010/0009647 A1* | 1/2010 | Taira | 455/255 |
| 2010/0097531 A1* | 4/2010 | Miura et al. | 348/735 |

FOREIGN PATENT DOCUMENTS

| | | |
|---|---|---|
| EP | 1328067 A1 | 7/2003 |
| JP | 03210825 A | 9/1991 |
| JP | H06-5227 U | 1/1994 |
| JP | 11-355168 A | 12/1999 |
| JP | 2003-078432 A | 3/2003 |
| JP | 2006-229619 | 8/2006 |
| JP | 2008-118474 A | 5/2008 |
| JP | 2008-136106 A | 6/2008 |
| JP | 2008-167000 | 7/2008 |

OTHER PUBLICATIONS

Patent Abstracts of Japan for patent application with Publication No. 2006-229619, Date of Publication: Aug. 31, 2006, 1 page.

(Continued)

*Primary Examiner* — Disler Paul
(74) *Attorney, Agent, or Firm* — Osha Liang LLP

(57) ABSTRACT

A receiving apparatus includes: a local oscillator to output first- and second-local-oscillator signals whose phases are orthogonal to each other; a mixer to output first- and second-intermediate-frequency signals; a first filter to allow a component from a desired signal to pass therethrough, and eliminate a component from an image signal having a frequency symmetrical with that of the desired signal, in the first- and second-intermediate-frequency signals; a second filter to allow a component from the image signal to pass therethrough, and eliminate a component from the desired signal, in the first- and second-intermediate-frequency signals; a comparator to compare levels between output signals of the first and second filters; and a control unit to switch a frequency of the first- and second-local-oscillator signals to a difference frequency between a frequency of the desired signal and the intermediate frequency or a sum frequency thereof, according to a comparison result of the comparator.

16 Claims, 5 Drawing Sheets

(56) References Cited

OTHER PUBLICATIONS

Mechanical English translation of patent application with Publication No. 2006-229619, Publication Date: Aug. 31, 2006, 12 pages.
Patent Abstracts of Japan for patent application with Publication No. 2008-167000, Publication Date: Jul. 17, 2008, 1 page.
Mechanical English translation for patent application with Publication No. 2008-167000, Publication Date: Jul. 17, 2008, 9 pages.
Search Report for European Application No. 10195271.1 mailed Apr. 20, 2011 (4 pages).
Patent Abstract for Japanese Publication No. 03210825 Publication date Sep. 13, 1991 (1 page).
Office Action issued in corresponding Japanese Application No. 2009-286758 dated Aug. 27, 2013, and English translation thereof (8 pages).
Partial translation of Japanese Publication No. 6-005227, published on Jan. 21, 1994 (1 page).

* cited by examiner

RECEIVING APPARATUS

CROSS-REFERENCE TO RELATED APPLICATION

This application claims the benefit of priority to Japanese Patent Application No. 2009-286758, filed Dec. 17, 2009, of which full contents are incorporated herein by reference.

BACKGROUND OF THE INVENTION

1. Field of the Invention

The present invention relates to a receiving apparatus.

2. Description of the Related Art

In wireless communication, a received signal is generally demodulated into a baseband signal after being subjected to a filtering process, a frequency converting process, an amplifying process, etc. Particularly, a superheterodyne receiving apparatus is known in general that mixes a received RF (Radio Frequency) signal with a local oscillator signal from LO (Local Oscillator), to be converted into an IF (Intermediate Frequency) signal. The superheterodyne receiving apparatus does not need a circuit handling high frequency wave after the frequency converting process from the RF signal to the IF signal.

The superheterodyne receiving apparatus receives not only a desired signal to be received but also an image signal having a frequency f2 (=2fL−f1) symmetrical with a frequency f1 of the desired signal with respect to a frequency fL of the local oscillator signal. Therefore, in order to prevent interference, the image signal should be eliminated when the received RF signals is converted into the IF signal.

For example, Japanese Laid-Open Patent Publication No. 2006-229619 discloses a high-frequency circuit, in which a received RF signal is mixed with each of a pair of local oscillator signals having phases orthogonal to each other and a pair of generated mixed signals are combined after the phases thereof are shifted by ±45 degrees, so that an image signal is eliminated. The high-frequency circuit mixes the RF signal and the local oscillator signals with a mixer using a Gilbert cell and the phases of the mixed signals are shifted with a polyphase filter.

For example, Japanese Laid-Open Patent Publication No. 2008-167000 discloses a receiving apparatus, in which a pair of mixed signals generated in the same manner is input to a complex BPF (Band-Pass Filter), so that an image signal is eliminated. The receiving apparatus uses a complex BPF capable of fast response, so-called Gm-C filter, includes a transconductance amplifier and a capacitance element.

As such, in a superheterodyne receiving apparatus, image signals are eliminated so that the interference can be prevented, and thus only the desired signals to be received can be received.

However, in the image signal eliminating method as described above, a phase shift and a gain deviation occurs in a pair of generated mixed signals due to variability of parts used therein and change in ambient temperature. The phase shift and the gain deviation causes the pair of the mixed signals not to have phases orthogonal to each other, or have amplitudes different from each other, the image signal remains without being completely eliminated. Thus, the interference occurs between the desired signal and the image signal, which deteriorates the communication quality of the receiving apparatus.

When a frequency of the IF signal is expressed by f0 (=|f1−fL|=|fL−f2|), a frequency difference Df between the desired signal and the image signal is as follows:

$$Df=|f1-f2|=2|fL-f2|=2f0.$$

Therefore, in the case of a low-IF receiving apparatus using the frequency f0 of the IF signal on the order of several ten to several hundred kHz, the frequency difference Df between the signals is small, which makes difficult to attenuate the image signals before the frequency converting process. Therefore, the image signals remarkably remain due to the phase shift and the gain deviation, particularly in the low-IF receiving apparatus.

SUMMARY OF THE INVENTION

A receiving apparatus according to an aspect of the present invention, includes: a local oscillator configured to output first and second local oscillator signals whose phases are orthogonal to each other; a mixer configured to mix a received signal with the first local oscillator signal and output a first intermediate frequency signal, and to mix a received signal with the second local oscillator signal and output a second intermediate frequency signal, the first and second intermediate frequency signals having a predetermined intermediate frequency; a first filter configured to allow a component from a desired signal to be received to pass therethrough, and eliminate a component from an image signal having a frequency symmetrical with a frequency of the desired signal with respect to a frequency of the first and second local oscillator signals, in the first and second intermediate frequency signals; a second filter configured to allow a component from the image signal to pass therethrough, and eliminate a component from the desired signal, in the first and second intermediate frequency signals; a comparator configured to compare levels between output signals of the first and second filters; and a control unit configured to switch the frequency of the first and second local oscillator signals to a difference frequency between the frequency of the desired signal and the intermediate frequency or to a sum frequency of the frequency of the desired signal and the intermediate frequency, according to a comparison result of the comparator.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

==Overall Configuration of Receiving Apparatus==

An overall configuration of a receiving apparatus according to a first embodiment of the present invention will hereinafter be described with reference to FIG. 2.

Figure 2:
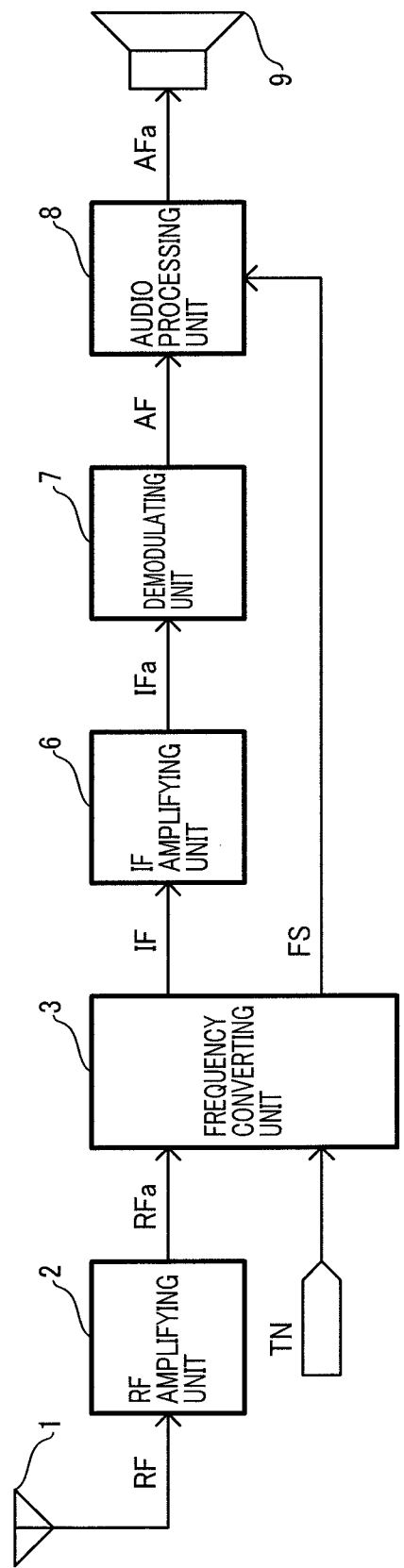
FIG. 2 is a block diagram illustrating an overall configuration of a receiving apparatus according to first and second embodiments of the present invention.

The receiving apparatus depicted in FIG. 2 includes an antenna 1, an RF amplifying unit 2, a frequency converting unit 3, an IF amplifying unit 6, a demodulating unit 7, an audio processing unit 8, and a speaker 9. The receiving apparatus is used for receiving an FM radio broadcast or an AM radio broadcast, for example.

An RF signal output from the antenna 1 is input to the RF amplifying unit 2, and an RFa signal output from the RF amplifying unit 2 is input to the frequency converting unit 3. An IF signal output from the frequency converting unit 3 is input to the IF amplifying unit 6, and an IFa signal output from the IF amplifying unit 6 is input to the demodulating unit 7. Further, an AF (audio frequency) signal output from the demodulating unit 7 is input to the audio processing unit 8, and an AFa signal output from the audio processing unit 8 is input to the speaker 9. On the other hand, a tuning signal TN is also input to the frequency converting unit 3, and a frequency switching signal FS output from the frequency converting unit 3 is input to the audio processing unit 8.

==Overall Operation of Receiving Apparatus==

An overall operation of the receiving apparatus according to an embodiment of the present invention will then be described.

The antenna 1 receives a broadcast wave of the FM radio broadcast or the AM radio broadcast, for example, and outputs the RF signal. The RF amplifying unit 2 selectively amplifies a frequency band of a desired signal to be received which is included in the RF signal and outputs the RFa signal. The frequency converting unit 3 converts a frequency of the RFa signal and outputs the IF signal after eliminating an image signal, etc., as needed using a complex BPF, etc. An operation of the frequency converting unit 3 will be described later in detail.

Although, for example, a typical FM radio receiving apparatus uses a frequency of 10.7 MHz, etc., as a frequency f0 of the IF signal, the receiving apparatus according to an embodiment of the present invention has a configuration which is preferable especially for a low-IF mode using the frequency f0 of the IF signal of the order of several ten to several hundred kHz. The IF signal is output as an analogue signal or a digital signal depending on a configuration subsequent to the IF amplifying unit 6.

The IF amplifying unit 6 amplifies the IF signal as needed according to a reception condition, and outputs the IFa signal. For example, the IF amplifying unit 6 includes an AGC (Automatic Gain Control) circuit that performs amplification with a gain corresponding to signal intensity of the IF signal and an IF filter that is a BPF whose passband width varying depending on the presence or absence of a disturbing signal such as adjacent disturbance and multipath disturbance. The demodulating unit 7 demodulates the IFa signal and outputs an AF signal.

The audio processing unit 8 controls sound volume and sound quality of the AF signal according to a reception condition and output the AFa signal. For example, the audio processing unit 8 includes a stereo demodulating unit that demodulates the AF signal into a stereo signal with stereo separation (degree of separation) corresponding to a reception condition, and a LPF (low-pass filter) that eliminates from the AF signal a component greater than or equal to a cutoff frequency corresponding to a reception condition. The audio processing unit 8 mutes the AFa signal when a frequency fL of a local oscillator signal is switched in the frequency converting unit 3, based on the frequency switching signal FS. The speaker 9 converts the AFa signal into sound, to be output.

==Configuration of Frequency Converting Unit==

A configuration of the frequency converting unit according to an embodiment of the present invention will hereinafter be described with reference to FIG. 1. In an embodiment of the present invention, in-phase signals I1 to I4 correspond to first intermediate frequency signals and quadrature signals Q1 to Q4 correspond to second intermediate frequency signals.

Figure 1:
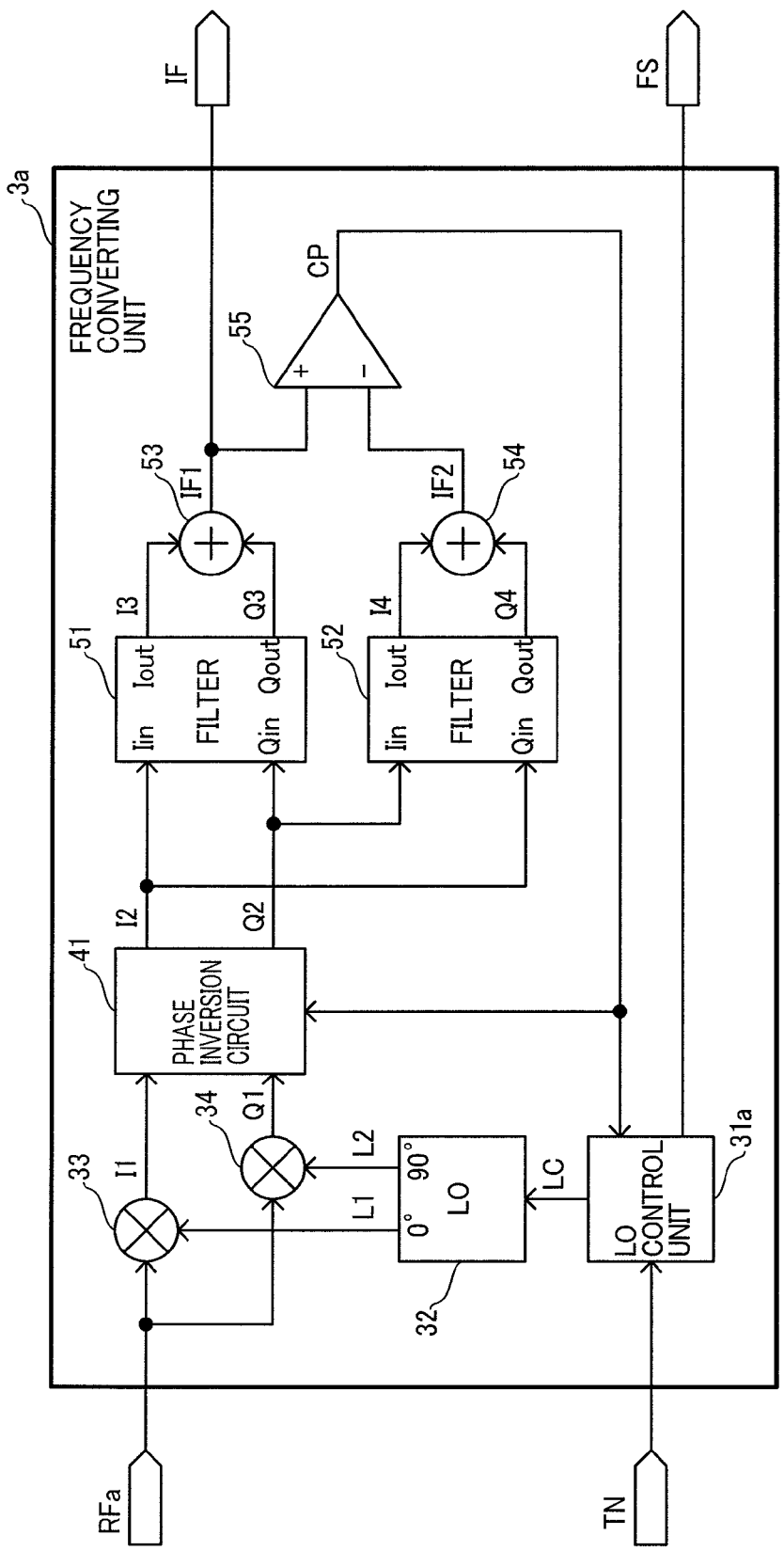
FIG. 1 is a block diagram illustrating a configuration of a frequency converting unit according to a first embodiment of the present invention.

A frequency converting unit 3a depicted in FIG. 1 includes an LO control unit 31a, an LO 32, mixers 33 and 34, a phase inverter circuit 41, filters 51 and 52, adders 53 and 54, and a comparator 55.

The tuning signal TN is input to the LO control unit 31a, and an LO control signal LC output from the LO control unit 31a is input to the LO 32. The LO 32 outputs a (first) local oscillator signal L1 and a (second) local oscillator signal L2. On the other hand, the LO control unit 31a also outputs the frequency switching signal FS.

Figure 6:
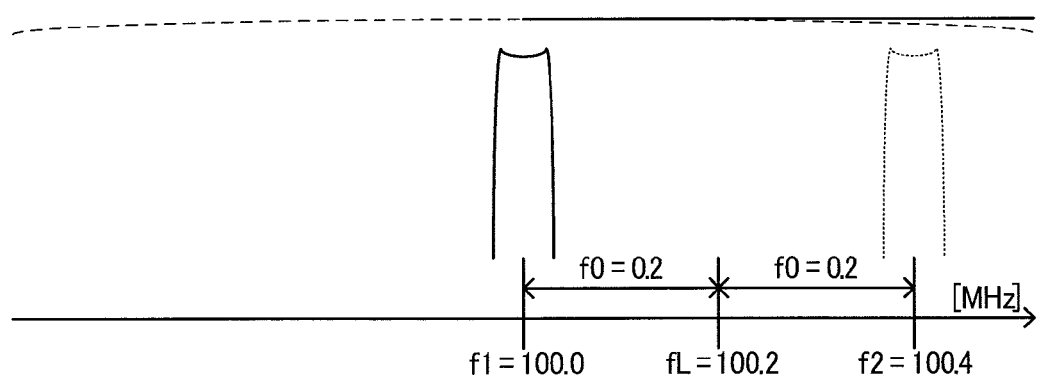
FIG. 6 is a schematic diagram illustrating an example of a relationship between a desired signal and an image signal in high side injection where a frequency fL of local oscillator signals is higher than a frequency fl of a desired signal.

The mixers 33 and 34 are made up using a Gilbert cell as depicted in FIG. 6 of Japanese Laid-Open Patent Publication No. 2006-229619, for example. The RFa signal and the local oscillator signal L1 are input to the mixer 33, and the in-phase signal I1 is output from the mixer 33. On the other hand, the RFa signal and the local oscillator signal L2 are input to the mixer 34, and the quadrature signal Q1 is output from the mixer 34. The in-phase signal I1 and the quadrature signal Q1 are input to the phase inverter circuit 41, and the in-phase signal I2 and the quadrature signal Q2 are output from the phase inverter circuit 41. A configuration of the phase inverter circuit 41 will be described later in detail.

Figure 4:
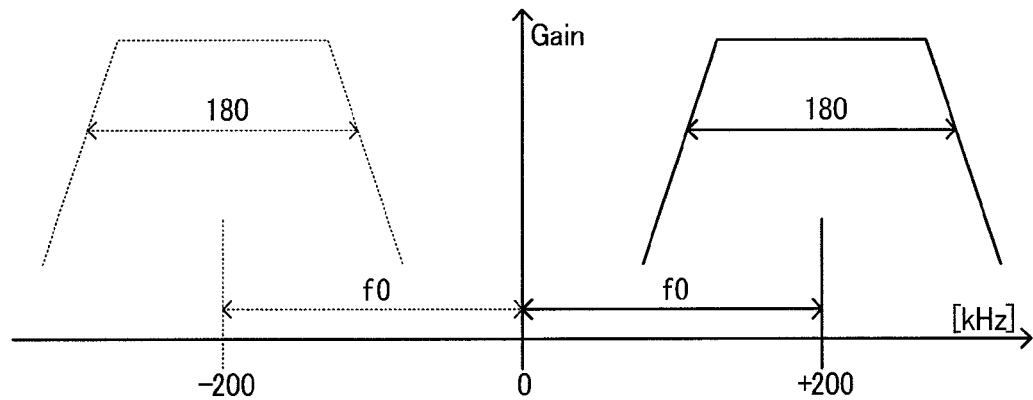
FIG. 4 is a diagram for explaining operations of filters 51 and 52.

The filters 51 and 52 are complex BPFs (Gm-C filters) including a transconductance amplifier and a capacitance element, as depicted in FIG. 4 of Japanese Laid-Open Patent Publication No. 2008-167000, for example. To the filter 51, the in-phase signal I2 is input as a real part of a complex signal and the quadrature signal Q2 is input as an imaginary part of the complex signal, and the filter 51 outputs the in-phase signal I3 and the quadrature signal Q3. On the other hand, to the filter 52, the quadrature signal Q2 is input as a real part of a complex signal and the in-phase signal I2 is input as an imaginary part of the complex signal, and the filter 52 outputs the in-phase signal I4 and the quadrature signal Q4.

In an embodiment of the present invention, the filters 51 and 52 have the same characteristics. As will be described later, in an embodiment of the present invention, the filter 51 allows a desired signal component to pass therethrough and eliminates an image signal component, and always corresponds to a first filter. On the other hand the filter 52 allows the image signal component to pass therethrough and eliminates the desired signal component, and always corresponds to a second filter.

The in-phase signal I3 and the quadrature signal Q3 are input to the adder 53, and an IF1 signal is output from the adder 53. The frequency converting unit 3a always outputs the IF1 signal as the IF signal. On the other hand, the in-phase signal I4 and the quadrature signal Q4 are input to the adder 54, and an IF2 signal is output from the adder 54. Further, the IF1 signal is input to a non-inverting input of the comparator 55, the IF2 signal is input to an inverting input thereof, and a comparison result signal CP output from the comparator 55 is returned to the LO control unit 31a and the phase inverter circuit 41.

==Example of Configuration of Phase Inverter Circuit==

A configuration of the phase inverter circuit 41 will hereinafter be described with reference to FIG. 3.

The phase inverter circuit 41 includes resistors R1 to R10, (NPN) transistors T1 to T6, current sources S1, S2, and a switch circuit SW, for example.

The positive side (I1p) and the negative side (I1n) of the in-phase signal I1 are input to the bases of the transistors T1 and T2, respectively. One ends of the resistors R2 and R4 are connected to the emitters of the transistors T1 and T2, respectively, and the other ends thereof are both supplied with sink currents from the current source S1 which is connected to a ground potential. One ends of the resistors R1 and R3 are connected to the collectors of the transistors T1 and T2, respectively, and the other ends thereof are both connected to a power supply potential VCC. A connection point between the transistor T1 and the resistor R1 and a connection point between the transistor T2 and the resistor R3 are output nodes on the positive side (I2p) and the negative side (I2n) of the in-phase signal I2, respectively.

The positive side (Q1p) and the negative side (Q1n) of the quadrature signal Q1 are input to the bases of the transistors T3 and T4, respectively. One ends of the resistors R6 and R8 are connected to the emitters of the transistors T3 and T4, respectively, and the other ends thereof are both supplied with sink currents via the switch SW from the current source S2 which is connected to the ground potential. One ends of the resistors R5 and R7 are connected to the collectors of the transistors T3 and T4, respectively, and the other ends thereof are both connected to the power supply potential VCC. A connection point between the transistor T3 and the resistor R5 and a connection point between the transistor T4 and the resistor R7 are output nodes on the positive side (Q2p) and the negative side (Q2n) of the quadrature signal Q2, respectively.

The positive side and the negative side of the quadrature signal Q1 are input to the bases of the transistors T5 and T6, respectively. One ends of the resistors R9 and R10 are connected to the emitters of the transistors T5 and T6, respectively, and the other ends thereof are both supplied with a sink current via the switch SW from the current source S2. The collector of the transistor T5 is connected to the output node on the negative side of the quadrature signal Q2 and the collector of the transistor T6 is connected to the output node on the positive side of the quadrature signal Q2.

As described above, depending on the state of the switch SW, the sink current supplied from the current source S2 is supplied to the transistors T3 and T4 via the resistors R6 and R8, or is supplied to the transistors T5 and T6 via the resistors R9 and R10. Therefore, comparing a connection state of the switch SW indicated by a solid line and a connection state of a short dashed line of FIG. 3, the phase of the quadrature signal Q2 to be output is inverted. Therefore, an inversion occurs according to the state of the switch SW, in the phase relationship between the in-phase signal I2 and the quadrature signal Q2, i.e., whether the phase of the quadrature signal Q2 is advanced or delayed by 90 degrees relative to the in-phase signal I2. The switch SW is controlled by the comparison result signal CP as will be described later.

==Operation of Frequency Converting Unit==

An operation of the frequency converting unit 3a according to an embodiment of the present invention will then be described. In the following description, a desired signal and an image signal included in the RFa signal are represented by H1 and H2, respectively.

Figure 5:
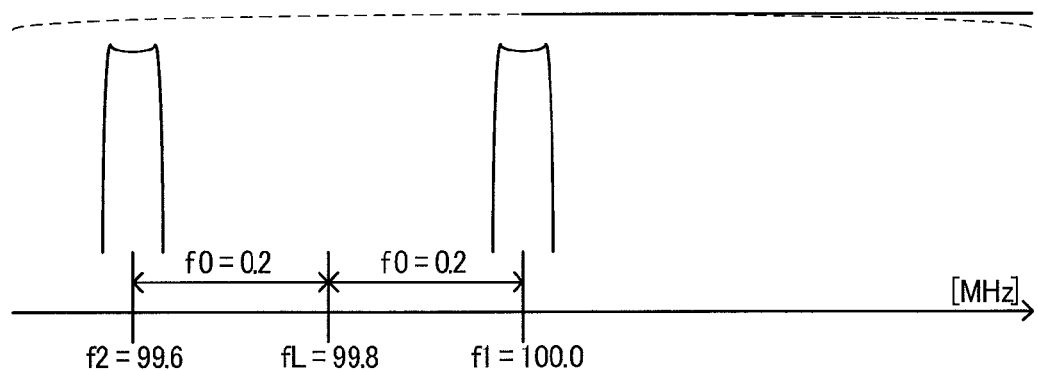
FIG. 5 is a schematic diagram illustrating an example of a relationship between a desired signal and an image signal in low side injection where a frequency fL of local oscillator signals is lower than a frequency f1 of a desired signal.

The operation will first be described for the case of low side injection where a frequency fL of the local oscillator signals L1 and L2 is lower than the frequency f1 of the desired signal H1. By way of example, assuming that the frequency f1 is 100 MHz and the frequency f0 of the IF signal is 200 kHz, the frequency fL is 99.8 MHz and the frequency f2 of the image signal H2 is 99.6 MHz, as depicted in FIG. 5. Therefore, a frequency difference Df between the desired signal H1 and the image signal H2 is only 400 kHz, and it is difficult to sufficiently attenuate the image signal H2 in the antenna 1 and the RF amplifying unit 2.

The desired signal H1 and the image signal H2 can respectively be expressed as follows:

$$H1 = A \cdot \sin(\omega 1 \cdot t); \text{ and}$$

$$H2 = B \cdot \sin(\omega 2 \cdot t),$$

where an amplitude and an angular frequency of the desired signal H1 are A and $\omega 1$ ($=2\pi \times f1$), respectively, and an amplitude and an angular frequency of the image signal H2 are B and $\omega 2$ ($=2\pi \times f2$), respectively. Since the IF amplifying unit 6 and the demodulating unit 7 can eliminate components other than the desired signal H1 and the image signal H2 included in the RFa signal, it is assumed that RFa=H1+H2 is satisfied in the following description.

The LO control unit 31a calculates the frequency fL in accordance with the frequency f1 corresponding to the tuning signal TN, and outputs the LO control signal LC for controlling the LO 32 such that the frequency of the local oscillator signals L1 and L2 is set at the calculated frequency fL. The frequency fL in the low side injection satisfies fL=f1−f0.

The LO 32 outputs the local oscillator signals L1 and L2 whose phases orthogonal to each other. Assuming that the local oscillator signal L2 is advanced 90 degrees in phase as compared to the signal L1 and that the angle frequency of the local oscillator signals L1 and L2 is $\omega L$ ($=2\pi \times fL$), the local oscillator signals L1 and L2 can be respectively expressed as follows:

$$L1 = \sin(\omega L \cdot t); \text{ and}$$

$$L2 = \cos(\omega L \cdot t).$$

The mixer 33 mixes the RFa signal with the local oscillator signal L1, and outputs the in-phase signal I1. Although the output signal of the mixer 33 contains frequency components of sums of the frequencies f1, f2 and the frequency fL (f1+fL, f2+fL), the frequency components of the sums can be eliminated by the filters 51 and 52 and the demodulating unit 7. Therefore, only a frequency component of a difference between the frequencies f1, f2 and the frequency fL (f1−fL=fL−f2=f0) is considered in the in-phase signal I1, and thus the in-phase signal I1 can be expressed as follows:

$$I1 = Rfa \times L1$$
$$= (A/2) \cdot \cos(\omega 0 \cdot t) + (B/2) \cdot \cos(\omega 0 \cdot t)$$

where the angle frequency of the IF signal is $\omega 0$ ($=2\pi \times f0$).

The mixer 34 mixes the RFa signal with the local oscillator signal L2 and outputs the quadrature signal Q1. Therefore, when calculation is made in the same manner as in the case of the in-phase signal I1, the quadrature signal Q1 can be expressed as follows:

$$Q1 = Rfa \times L2$$
$$= (A/2) \cdot \cos(\omega 0 \cdot t) + (B/2) \cdot \cos(\omega 0 \cdot t).$$

As described above, the phase inverter circuit 41 inverts the phase of the quadrature signal Q1 according to the comparison result signal CP. In the case of the low side injection, assuming that the connection state of the switch SW of FIG. 3 is as indicated by the solid line, the phase relationship between the in-phase signal I1 and the quadrature signal Q1 is not changed by the phase inverter circuit 41. Therefore, it is considered that I2=I1 and Q2=Q1 are satisfied.

To the filter 51 which is a complex BPF, the in-phase signal I2 is input as a real part of a complex signal and the quadrature signal Q2 is input as an imaginary part of the complex signal, as described above. Therefore, when an imaginary unit is represented by j, the complex signal input to the filter 51 can be expressed as follows:

$$I2 + jQ2 = I1 + jQ1$$
$$= (A/2) \cdot \exp(j \cdot \omega 0 \cdot t) +$$
$$(B/2) \cdot \exp(-j \cdot \omega 0 \cdot t).$$

For example, as depicted in FIG. 4, the filter 51 allows only a positive frequency component with the frequency f0 centered to pass therethrough and cuts off a negative frequency component. In FIG. 4, by way of example, a bandwidth is set at 180 kHz. Therefore, the complex signal output from the filter 51 is expressed as $$I3+jQ3=(A/2) \cdot \exp(j \cdot \omega 0 \cdot t),$$

and the image signal component is eliminated. The adder 53 adds the in-phase signal I3 and the quadrature signal Q3, and outputs the IF1 signal containing the desired signal component.

On the other hand, to the filter 52 which is a complex BPF, the quadrature signal Q2 is input as a real part of a complex signal and the in-phase signal I2 is input as an imaginary part of the complex signal, as described above. Therefore, the complex signal input to the filter 52 can be expressed as follows:

$$Q2 + jI2 = Q1 + jI1$$
$$= j \cdot (I1 - jQ1)$$
$$= (A/2) \cdot j \cdot \exp(-j \cdot \omega 0 \cdot t) +$$
$$(B/2) \cdot j \cdot \exp(j \cdot \omega 0 \cdot t).$$

Since the filter 52 has the same characteristics as the filter 51 as described above, the complex signal output from the filter 52 is expressed as $$I4+jQ4=(B/2) \cdot j \cdot \exp(j \cdot \omega 0 \cdot t),$$

and the desired signal component is eliminated. The adder 54 adds the in-phase signal I4 and the quadrature signal Q4, and outputs the IF2 signal containing the image signal component.

The comparator 55 compares the levels between the IF1 signal and the IF2 signal, and outputs the comparison result signal CP. The comparison result signal CP goes low when the IF2 signal is higher in level than the IF1 signal.

As described above, the frequency converting unit 3a can eliminate the image signal component with the filter 51, and output the IF1 signal as the IF signal. However, if a phase shift or a gain deviation occurs in the in-phase signal I2 and the quadrature signal Q2, the image signal component is not completely eliminated, and remains in the IF1 signal. As an amplitude B of the image signal H2 is increased relative to amplitude A of the desired signal H1, the image signal component remains in the IF1 signal at a higher rate, which may generate interference.

In an embodiment of the present invention, for example, if the comparison result signal CP goes low in the case of the low side injection, switching to high side injection is performed where the frequency fL of the local oscillator signals L1 and L2 is higher than the frequency f1 of the desired signal H1, so that the interference is prevented. In such case, as depicted in FIG. 6, the frequency fL is set at 100.2 MHz and the frequency f2 of the image signal H2 is set at 100.4 MHz. Therefore, the image signal in the case of the low side injection, i.e., the signal having a frequency of 99.6 MHz, does not interfere with the desired signal H1. A description will hereinafter be given of a specific operation in the case of switching from the low side injection to the high side injection.

As described above, in the low side injection, the LO control unit 31a outputs such LO control signal LC as to satisfy fL=f1−f0. When the comparison result signal CP goes low, the LO control unit 31a outputs such LO control signal LC as to satisfy fL=f1+f0, and switching to the high side injection is performed.

As is the case with the low side injection, the mixers 33 and 34 mix the Rfa signals with the local oscillator signals L1 and L2, respectively, and output the in-phase signal I1 and the quadrature signal Q1, respectively. On the other hand, in the high side injection, since a frequency difference between the frequencies f1 and f2 and the frequency fL is fL−f1=f2−fL=f0, the in-phase signal I1 and the quadrature signal Q1 can be respectively expressed as follows:

$$I1=(A/2) \cdot \cos(\omega 0 \cdot t)+(B/2) \cdot \cos(\omega 0 \cdot t); \text{ and}$$

$$Q1=-(A/2) \cdot \cos(\omega 0 \cdot t)+(B/2) \cdot \cos(\omega 0 \cdot t).$$

Figure 3:
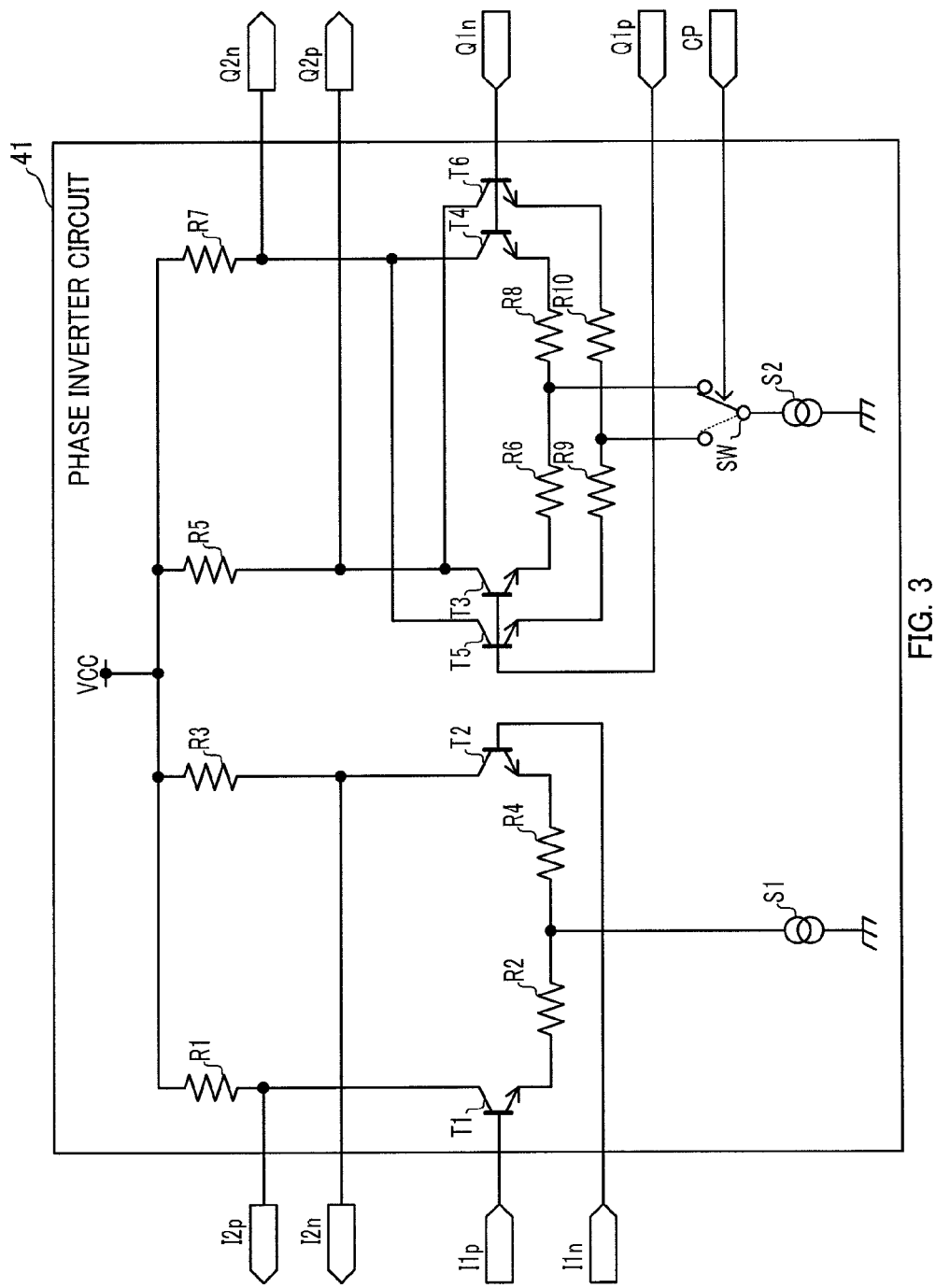
FIG. 3 is a circuit block diagram illustrating an example of a specific configuration of a phase inverter circuit 41.

As described above, in the case of the low side injection, the phase inverter circuit 41 has the connection state of the switch SW of FIG. 3 as indicated by the solid line, and the phase relationship between the in-phase signal I1 and the quadrature signal Q1 is not changed. When the comparison result signal CP goes low, the phase inverter circuit 41 switches the connection state of the switch SW of FIG. 3 to such a state as indicated by the short dashed line, and inverts the phase of the quadrature signal Q1. Therefore, in the high side injection, it is considered that I2=I1 and Q2=−Q1 are satisfied.

As is the case with the low side injection, the in-phase signal I2 and the quadrature signal Q2 are input as complex signals to the filters 51 and 52 that are complex BPFs, and the complex signals input to the filters 51 and 52 can respectively be expressed as follows:

$$I2 + jQ2 = I1 - jQ1$$
$$= (A/2) \cdot \exp(j \cdot \omega 0 \cdot t) +$$
$$(B/2) \cdot \exp(-j \cdot \omega 0 \cdot t);$$

and $$Q2 + jI2 = -Q1 + jI1$$
$$= j \cdot (I1 + jQ1)$$
$$= (A/2) \cdot j \cdot \exp(-j \cdot \omega 0 \cdot t) +$$
$$(B/2) \cdot j \cdot \exp(j \cdot \omega 0 \cdot t).$$

The complex signals output from the filters 51 and 52 are respectively expressed as follows:

$$I3 + jQ3 = (A/2) \cdot \exp(j \cdot \omega 0 \cdot t); \text{ and}$$

$$I4 + jQ4 = (B/2) \cdot j \cdot \exp(j \cdot \omega 0 \cdot t).$$

Therefore, as is the case with the low side injection, the filters 51 and 52 eliminate the image signal component and the desired signal component, respectively, and the adders 53 and 54 output the IF1 signal containing the desired signal component and the IF2 signal containing the image signal component, respectively.

As described above, the comparator 55 compares the levels between the IF1 signal and the IF2 signal, and outputs the comparison result signal CP which goes low when the IF2 signal is higher in level than the IF1 signal.

On the other hand, if the comparison result signal CP goes low in the high side injection, the LO control unit 31a outputs such LO control signal LC as to satisfy fL=f1−f0, and switching to the low side injection is performed. The phase inverter circuit 41 switches the connection state of the switch SW of FIG. 3 to such a state as indicated by the solid line, and does not invert the phase of the quadrature signal Q1.

As such, in the frequency converting unit 3a according to an embodiment of the present invention, if the IF2 signal is higher in level than the IF1 signal, switching is performed between the low side injection (fL=f1−f0) and the high side injection (fL=f1+f0), so that the interference can be prevented.

The LO control unit 31a outputs the frequency switching signal FS that goes high when switching is performed between the low side injection and the high side injection, i.e., when the frequency fL is switched, for example. The audio processing unit 8 can prevent noise from being output from the speaker 9 at the time of switching of the frequency fL, by muting the AFa signal while the frequency switching signal FS is high.

Second Embodiment

==Configuration of Frequency Converting Unit==

Overall configuration and an operation of the receiving apparatus according to a second embodiment of the present invention are the same as those of the receiving apparatus according to a first embodiment of the present invention.

A configuration of the frequency converting unit according to an embodiment of the present invention will hereinafter be described with reference to FIG. 7. In this embodiment of the present invention, the in-phase signals I1, I3, and I4 correspond to the first intermediate frequency signals and the quadrature signals Q1, Q3, and Q4 correspond to the second intermediate frequency signals.

Figure 7:
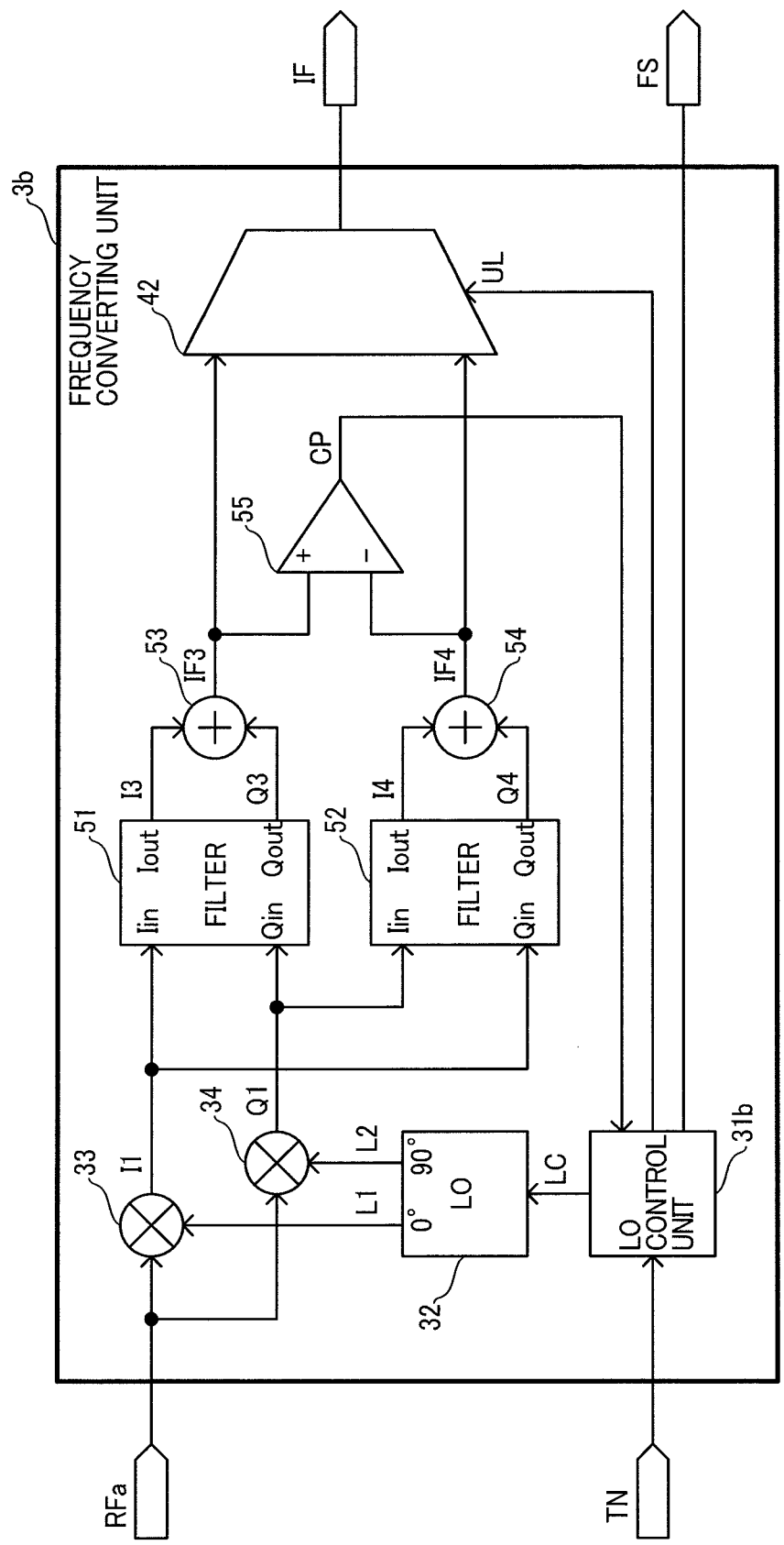
FIG. 7 is a block diagram illustrating a configuration of a frequency converting unit according to a second embodiment of the present invention.

A frequency converting unit 3b depicted in FIG. 7 includes an LO control unit 31b in place of the LO control unit 31a, and a multiplexer (selection circuit) 42 in place of the phase inverter circuit 41, as compared to the frequency converting unit 3a according to a first embodiment of the present invention.

The tuning signal TN is input to the LO control unit 31b, and the LO control signal LC output from the LO control unit 31b is input to the LO 32. The LO 32 outputs the local oscillator signals L1 and L2. On the other hand, the LO control unit 31b also outputs the frequency switching signal FS and an up/down selecting signal UL.

As is the case with a first embodiment of the present invention, the RFa signal and the local oscillator signal L1 are input to the mixer 33, the RFa signal and the local oscillator signal L2 are input to the mixer 34, and the mixers 33 and 34 output the in-phase signal I1 and the quadrature signal Q1, respectively. In an embodiment of the present invention, the in-phase signal I1 and the quadrature signal Q1 are directly input to the filters 51 and 52.

To the filter 51, the in-phase signal I1 is input as a real part of a complex signal and the quadrature signal Q1 is input as an imaginary part of the complex signal, and the filter 51 outputs the in-phase signal I3 and the quadrature signal Q3. On the other hand, to the filter 52, the quadrature signal Q1 is input as a real part of a complex signal, and the in-phase signal I1 is input as an imaginary part of the complex signal, and the filter 52 outputs the in-phase signal I4 and the quadrature signal Q4.

As is the case with a first embodiment of the present invention, in this embodiment of the present invention as well, the filters 51 and 52 have the same characteristics. As will be described later, in this embodiment of the present invention, filters corresponding to the first and second filters are interchanged depending on the cases of the low side injection and the high side injection.

The in-phase signal I3 and the quadrature signal Q3 are input to the adder 53, and an IF3 signal is output from the adder 53. On the other hand, the in-phase signal I4 and the quadrature signal Q4 are input to the adder 54, and an IF4 signal is output from the adder 54. The IF3 signal is input to the non-inverting input of the comparator 55, the IF4 signal is input to the inverting input thereof, and the comparison result signal CP output from the comparator 55 is returned to the LO control unit 31b. The IF3 signal and the IF4 signal are input to data inputs of the multiplexer 42, and the up/down selecting signal UL is input to a selection control input. The IF signal output from the multiplexer 42 is output from the frequency converting unit 3b.

==Operation of Frequency Converting Unit==

An operation of the frequency converting unit 3b according to an embodiment of the present invention will then be described.

The operation will first be described for the case of the low side injection.

In a first embodiment of the present invention, in the case of the low side injection, the phase relationship between the in-phase signal I1 and the quadrant signal Q1 is not changed by the phase inverter circuit 41. Therefore, in this embodiment of the present invention, as is the case with a first embodiment of the present invention, the image signal component is eliminated by the filter 51 corresponding to the first filter, and the desired signal component is eliminated by the filter 52 corresponding to the second filter. Therefore, the IF3 signal and the IF4 signal in this embodiment of the present invention are equivalent to the IF1 signal and the IF2 signal in a first embodiment of the present invention. The comparison result signal CP goes low when the IF4 signal is higher in level than the IF3 signal.

The multiplexer 42 selects and outputs either one of the IF3 signal and the IF4 signal as the IF signal according to the up/down selecting signal UL which is indicative of the current frequency fL. More specifically, the up/down selecting signal UL indicates the high side injection or the low side injection, and goes high in the case of the high side injection and goes low in the case of the low side injection, for example. In the case of the low side injection, the multiplexer 42 outputs the IF3 signal as the IF signal.

A description will then be given of the operation in the case of switching from the low side injection to the high side injection.

In the low side injection, the LO control unit 31b outputs such LO control signal LC as to satisfy fL=f1−f0. When the comparison result signal CP goes low, the LO control unit 31b outputs such LO control signal LC as to satisfy fL=f1+f0, and switching to the high side injection is performed.

As described above, in this embodiment of the present invention, since the in-phase signal I1 and the quadrant signal Q1 are directly input to the filters 51 and 52, the complex signals input to the filters 51 and 52 can respectively be expressed as follows:

$$I1 + jQ1 = (A/2) \cdot \exp(-j \cdot \omega 0 \cdot t) + (B/2) \cdot \exp(j \cdot \omega 0 \cdot t);$$

and $$Q1 + jI1 = j \cdot (I1 - jQ1)$$
$$= (A/2) \cdot j \cdot \exp(j \cdot \omega 0 \cdot t) +$$
$$(B/2) \cdot j \cdot \exp(-j \cdot \omega 0 \cdot t).$$

The complex signals output from the filters 51 and 52 are respectively expressed as follows:

$$I3+jQ3=(B/2)\cdot exp(j\cdot\omega 0\cdot t);\text{ and}$$

$$I4+jQ4=(A/2)\cdot j\cdot exp(j\cdot\omega 0\cdot t).$$

Therefore, the image signal component is eliminated by the filter 52, and the desired signal component is eliminated by the filter 51. In the case of the high side injection, the filter 52 corresponds to the first filter, and the filter 51 corresponds to the second filter. The adder 53 outputs the IF3 signal containing the image signal component, and the adder 54 outputs the IF4 signal containing the desired signal component. In the case of the high side injection, the multiplexer 42 outputs the IF4 signal as the IF signal.

On the other hand, in the case of the high side injection, when the comparison result signal CP goes high, i.e., when the IF3 signal becomes higher in level than the IF4 signal, the LO control unit 31b performs switching to the low side injection.

As such, in the frequency converting unit 3b according to this embodiment of the present invention, switching is performed between the low side injection and the high side injection according to the comparison result signal CP and according to whether the present heterodyne is the high side injection or the low side injection, so that the interference can be prevented.

As described above, in the frequency converting unit 3, switching is performed between the low side injection and the high side injection according to a comparison result between the output signal level of the first filter which eliminates the image signal component from the in-phase signal and the quadrant signal and the output signal level of the second filter which eliminates the desired signal component therefrom, so that the interference between the desired signal H1 and the image signal H2 can be prevented even if a phase shift or a gain deviation occurs.

The first and second filters are configured as complex BPFs to which the in-phase signals and the quadrant signals are input as complex signals, and only either one of the positive and negative frequency components of the input signal is allow to pass therethrough so that the image signal component or the desired signal component can be removed.

In the frequency converting unit 3a, the quadrature signal Q1 is inverted in phase according to the comparison result signal CP, and the in-phase signal I2 and the quadrature signal Q2 are interchanged to be input to the filter 52, so that the image signal component and the desired signal component can be respectively eliminated using the filters 51 and 52 with the same characteristics.

In the frequency converting unit 3b, switching is performed between the low side injection and the high side injection according to the comparison result signal CP and according to whether the current heterodyne is the high side injection or the low side injection, so that the image signal component and the desired signal component can be eliminated without using a phase inverter circuit using the filters 51 and 52 having the same characteristics.

the frequency switching signal FS is output which goes high when switching is performed between the low side injection and the high side injection, and the AFa signal is muted while the frequency switching signal FS is high, so that the noise can be prevented from being output from the speaker 9 at the time of switching of the frequency fL.

In the above described embodiments of the present invention, the filters 51 and 52 have the same characteristics and the in-phase signal and the quadrature signal are interchanged and input to the filter 52, but this is not a limitative. For example, a configuration may be such that the in-phase signal and the quadrature signal is input to both of the filters in the same manner, one filter allows only a positive frequency component (portion of a solid line of FIG. 4) to pass therethrough, and the other filter allows only a negative frequency component (portion of a short dashed line of FIG. 4) to pass therethrough. In such case, either one of the filters can eliminate the image signal component, and the other one of the filters can eliminate the desired signal component.

In the above described embodiments, the frequency switching signal FS goes high when switching is performed between the low side injection and the high side injection, but this is not a limitative. Further, the frequency switching signal FS may also be set to high, when the frequency fL fluctuates in association with change in the frequency f1 corresponding to the tuning signal TN.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A receiving apparatus comprising:
   a local oscillator configured to output first and second local oscillator signals whose phases are orthogonal to each other;
   a mixer configured to mix a received signal with the first local oscillator signal and output a first intermediate frequency signal, and to mix a received signal with the second local oscillator signal and output a second intermediate frequency signal, the first and second intermediate frequency signals having a predetermined intermediate frequency;

a first filter configured to allow a component from a desired signal to be received to pass therethrough, and eliminate a component from an image signal having a frequency symmetrical with a frequency of the desired signal with respect to a frequency of the first and second local oscillator signals, in the first and second intermediate frequency signals;

a second filter configured to allow a component from the image signal to pass therethrough, and eliminate a component from the desired signal, in the first and second intermediate frequency signals;

a comparator configured to compare levels between output signals of the first and second filters; and a control unit configured to switch the frequency of the first and second local oscillator signals to a difference frequency between the frequency of the desired signal and the intermediate frequency or to a sum frequency of the frequency of the desired signal and the intermediate frequency, according to a comparison result of the comparator.

2. The receiving apparatus of claim 1, wherein
the first and second filters are a pair of complex filters configured to be input with the first and second intermediate frequency signals as a complex signal, and allow either one of positive and negative frequency components of an input signal to pass therethrough.

3. The receiving apparatus of claim 2, further comprising
a phase inverter circuit configured to invert a phase of either one of the first intermediate frequency signal and the second intermediate frequency signal according to a comparison result of the comparator, wherein
the first intermediate frequency signal and the second intermediate frequency signal are input to the first filter as a real part of the complex signal and an imaginary part of the complex signal, respectively, and either one of the positive and negative frequency components of the input signal is allowed by the first filter to pass therethrough, and wherein
the first intermediate frequency signal and the second intermediate frequency signal are input to the second filter as an imaginary part of the complex signal and a real part of the complex signal, respectively, and the same frequency component of the input signal as the frequency component in the first filter is allowed by the second filter to pass therethrough.

4. The receiving apparatus of claim 2, further comprising
a selection circuit configured to select and output either one of output signals of the pair of the complex filters according to a current frequency of the first and second local oscillator signals, wherein
the control unit switches the frequency of the first and second local oscillator signals according to a comparison result of the comparator and the current frequency of the first and second local oscillator signals.

5. The receiving apparatus of claim 1, further comprising
a demodulating unit configured to demodulate an output signal of the first filter into an audio signal, and
an audio processing unit configured to mute the audio signal when the frequency of the first and second local oscillator signals is switched.

6. The receiving apparatus of claim 2, further comprising
a demodulating unit configured to demodulate an output signal of the first filter into an audio signal, and
an audio processing unit configured to mute the audio signal when the frequency of the first and second local oscillator signals is switched.

7. The receiving apparatus of claim 3, further comprising
a demodulating unit configured to demodulate an output signal of the first filter into an audio signal, and
an audio processing unit configured to mute the audio signal when the frequency of the first and second local oscillator signals is switched.

8. The receiving apparatus of claim 4, further comprising
a demodulating unit configured to demodulate an output signal of the first filter into an audio signal, and
an audio processing unit configured to mute the audio signal when the frequency of the first and second local oscillator signals is switched.

9. A receiving apparatus comprising:
a local oscillator configured to output first and second local oscillator signals whose phases are orthogonal to each other;

a mixer configured to mix a received signal with the first local oscillator signal and output a first intermediate frequency signal, and to mix a received signal with the second local oscillator signal and output a second intermediate frequency signal, the first and second intermediate frequency signals having a predetermined intermediate frequency;

a first filter configured to allow a component from a desired signal to be received to pass therethrough, and eliminate a component from an image signal having a frequency symmetrical with a frequency of the desired signal with respect to a frequency of the first and second local oscillator signals, in the first and second intermediate frequency signals;

a second filter configured to allow a component from the image signal to pass therethrough, and eliminate a component from the desired signal, in the first and second intermediate frequency signals;

a first adder configured to add a first in-phase signal and a first quadrature signal that contain a component of the desired signal allowed to pass through the first filter;

a second adder configured to add a second in-phase signal and a second quadrature signal that contain a component of the image signal allowed to pass through the second filter;

a comparator configured to compare levels between output signals of the first and second adders; and a control unit configured to switch the frequency of the first and second local oscillator signals to a difference frequency between the frequency of the desired signal and the intermediate frequency or to a sum frequency of the frequency of the desired signal and the intermediate frequency, according to a comparison result of the comparator.

10. The receiving apparatus of claim 9, wherein
the first and second filters are a pair of complex filters configured to be input with the first and second intermediate frequency signals as a complex signal, and allow either one of positive and negative frequency components of an input signal to pass therethrough.

11. The receiving apparatus of claim 10, further comprising
a phase inverter circuit configured to invert a phase of either one of the first intermediate frequency signal and the second intermediate frequency signal according to a comparison result of the comparator, wherein
the first intermediate frequency signal and the second intermediate frequency signal are input to the first filter as a real part of the complex signal and an imaginary part of the complex signal, respectively, and either one of the positive and negative frequency components of the input signal is allowed by the first filter to pass therethrough, and wherein the first intermediate frequency signal and the second intermediate frequency signal are input to the second filter as an imaginary part of the complex signal and a real part of the complex signal, respectively, and the same frequency component of the input signal as the frequency component in the first filter is allowed by the second filter to pass therethrough.

12. The receiving apparatus of claim 10, further comprising a selection circuit configured to select and output either one of output signals of the pair of the complex filters according to a current frequency of the first and second local oscillator signals, wherein the control unit switches the frequency of the first and second local oscillator signals according to a comparison result of the comparator and the current frequency of the first and second local oscillator signals.

13. The receiving apparatus of claim 9, further comprising
a demodulating unit configured to demodulate an output signal of the first filter into an audio signal, and
an audio processing unit configured to mute the audio signal when the frequency of the first and second local oscillator signals is switched.

14. The receiving apparatus of claim 10, further comprising
a demodulating unit configured to demodulate an output signal of the first filter into an audio signal, and
an audio processing unit configured to mute the audio signal when the frequency of the first and second local oscillator signals is switched.

15. The receiving apparatus of claim 11, further comprising
a demodulating unit configured to demodulate an output signal of the first filter into an audio signal, and
an audio processing unit configured to mute the audio signal when the frequency of the first and second local oscillator signals is switched.

16. The receiving apparatus of claim 12, further comprising
a demodulating unit configured to demodulate an output signal of the first filter into an audio signal, and
an audio processing unit configured to mute the audio signal when the frequency of the first and second local oscillator signals is switched.

* * * * *